D. A. DANFORTH.
STUMP EXTRACTOR.
No. 41,490. Patented Feb. 9, 1864.
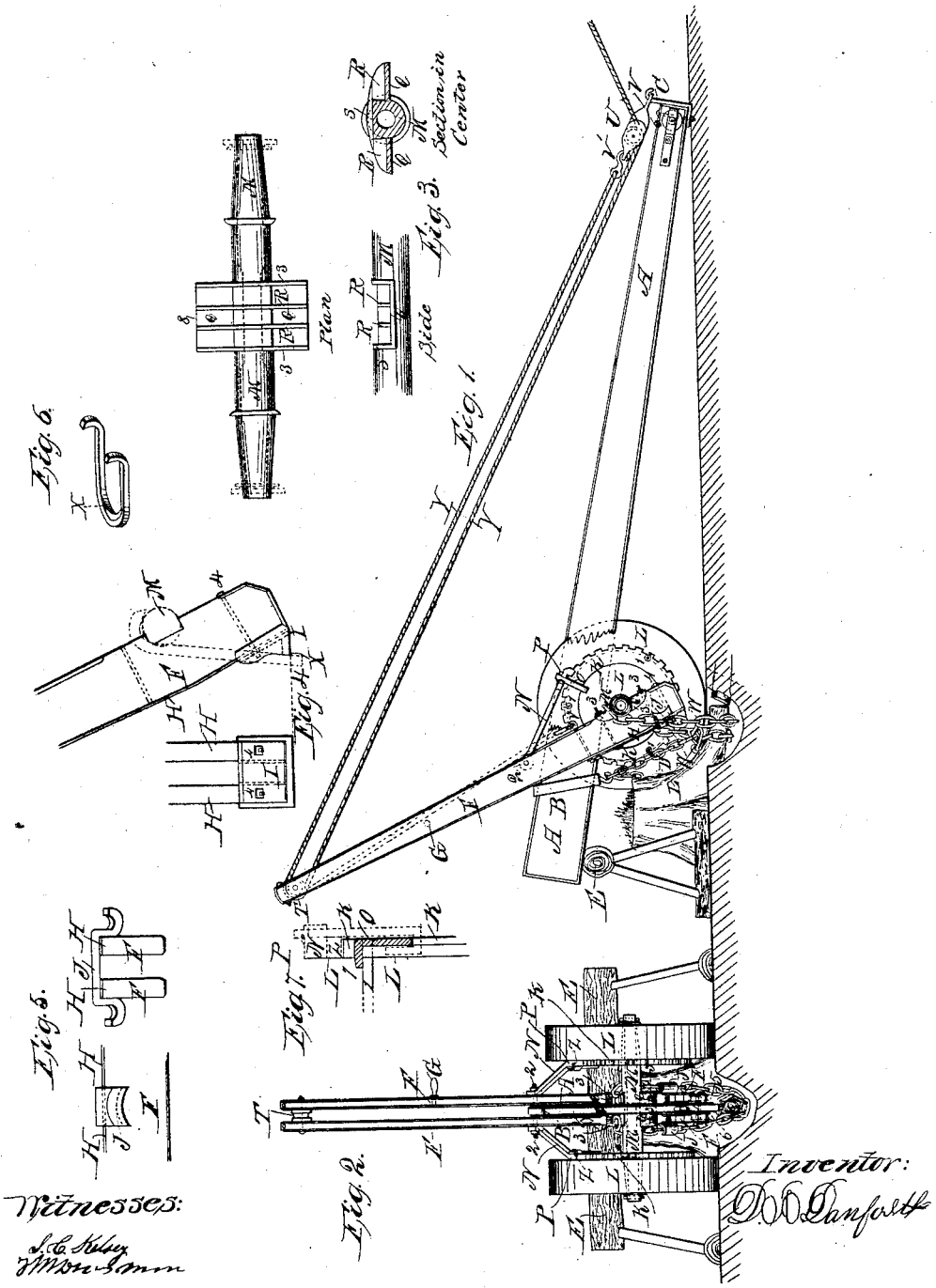

UNITED STATES PATENT OFFICE.

D. A. DANFORTH, OF ELKHART, INDIANA.

IMPROVEMENT IN STUMP-EXTRACTORS.

Specification forming part of Letters Patent No. 41,490, dated February 9, 1864.

*To all whom it may concern:*

Be it known that I, D. A. DANFORTH, of Elkhart, in the county of Elkhart and State of Indiana, have invented a new and useful Machine for the Purpose of Extracting Stumps and Grubs; and I do hereby declare that the following is a clear and exact description of the construction and operation of the same, reference being had to the annexed drawings, making a part of this specification, in which—

Figure 1 is a side elevation, with the nearest wheel, L, nearest brace, N, and a portion of the lever A removed to show the action of the catch Z and guide O upon the ratchet K on the farther wheel, L. Fig. 2 is a front elevation; Fig. 3, a plan, side, and section of the axle M, showing the shape of the core, the flanges Q Q, and ribs R and S; Fig. 4, the shape of the bite I and mode of attaching it to the lever F; Fig. 5, the saddle J (front and side) to support the chain W; Fig. 6, the hooked binder, showing the edge drawn forward at X; and Fig. 7 a section of the ratchet K, showing the flange to receive the hook or guide O, and the relative position of the stud 7 with the bolt 1, also by the dotted lines, the notch in the top of O, and the lug on top of brace N to receive a key at P.

The same letters refer to like parts.

The auxiliary lever A A may be either single, as shown in the drawings, to pass between the levers F F, or double to pass on the outside. This lever is to increase the power of the machine. The levers F F are bolted to the flanges Q Q of the axle M, between the ribs R and S. The ratchet K is made with a flange on the inner side, Fig. 7, to receive the hook or guide O, on which the guide O can freely slide, but yet will keep the lever N and catch Z in their proper position with respect to the ratchet K when the machine is worn by use. The ratchet K has also studs at the side of each bolt 7, Fig. 7, to assist the bolts in keeping the ratchet from turning on the wheel L. The braces N N have their ends turned down at right angles to form the catches Z Z, so that they will act upon the ratchet-teeth in either direction to assist in rolling the machine up to the stump or tree and keeping the machine in position for adjustment.

With the "Elkhart grubber," patented by myself and Wm. A. Wilkinson, July 2, 1861, there is often much difficulty in getting the machine up to the grub to be pulled, on account of the ground rising generally about the roots, and it requires an additional man to get the machine in place and keep it there, and to put the braces in the cogs, while the catches Z Z in this machine, guided and supported with the guides O O, will fall into the teeth of K when the lever F is raised to an angle of forty-five degrees, and will hold the wheels and turn them closer to the grub or stump as the lever is brought to the proper position, as in Figs. 1 and 2, for hitching, making it easy for one man to operate the machine in place of requiring two.

The hooks or guides O O are attached to N N by passing dovetailed between lugs on the sides N N, and are keyed at the top through a notch at P. This hook or guide O should be turned up sufficiently far behind the flange of K that it will not come by the flange when the catch Z is in the bottom of the cogs or teeth. The hook O, in addition to being a guide for the catch Z, is also to support the brace N when the lever F is turned forward in a horizontal position, as when the machine is being removed from place to place, and also to keep the brace N from catching in the ground when it runs backward. The core or hollow through the axle M is of variable size, so that the maximum strength of metal to resist the strain at the different points may be had in combination with minimum weight of metal for the whole axle. The shape of the core I use is shown by the dotted lines on plan of Fig. 3. I make the core between the flanges Q Q, and for about one and a half inches on each side, of the same size as at the ends of the axle, and from there to the inner edges of the wheels L L, so that the metal will be about three-fourths of an inch thick, and thence tapering to either end, but do not confine myself to that particular size or proportion. The edge of the hooked binder, Fig. 6, is drawn forward at X to give it such shape that it will not slip off the grub when the bark is loose from the circulation of the sap, as the hook will that is used in Patent No. 1,680, referred to heretofore.

In using this machine for pulling large stumps or trees it is rolled against the stump or tree to be pulled with the lever A removed and the lever F turned forward in a horizontal position. When it is nearly in place, the lever F is raised to the position shown in Fig. 1, which will roll the wheels in place, and the chain W is passed around the lever F, above the axle M, and over the saddle J, or its equivalent, to and about the root. The lever A is then placed in position, with the large end either on a horse or trestle, E, or some other support, and the stirrup B upon it back of the lever F. The chain D is hooked to the stirrup B and attached to the root with the chain W. The rope Y is attached to the pulley-block at V and up around the pulley at T, back around V, and thence to the team.

The number of pulleys used and stringing the rope depends upon the power required. The action of the combination of levers and mechanism is that the lever F is drawn forward, acting on the stump or tree with the axle M and the saddle J as points of leverage, while at the same time the lever A rises and acts on the support E as a fulcrum.

In drawing small stumps the lever A and chain W are not used, and the hook V' is hooked into the ring V" on lever F, or the hole 8 in the top of flange Q, and the team draws directly from the pulley T. In this case the hooked binder, Fig. 6, is passed around the stump and hung over the axle M, on each side of F, bringing the stump between the edge X of the binder and the bite I, and the stump is raised with the bite I and bottom of the wheels L L as points of leverage, the wheels being locked with Z Z.

What I claim as my invention is—

1. The combination of the levers A and F, hook C, pulley-block U, and stirrup B, for the purpose and in the manner described.

2. The combination of the saddle J, chain W, and lever F, in the manner and for the purpose herein described.

3. The combination of the hook or guide O and brace N with flange on inner side of ratchet K and lever F, for the purpose herein described.

4. The combination of the flange Q Q and ribs R S, in combination with the axle M and lever F, for the purpose herein described.

D. A. DANFORTH.

Witnesses:
S. C. KELSY,
W. W. DINSMORE.